Oct. 4, 1955  F. S. LAMB ET AL  2,719,426
APPARATUS FOR MEASURING GAS PRESSURE IN SEALED VESSELS
Filed April 23, 1952  3 Sheets-Sheet 1

Inventors:
Fredrick S. Lamb
George J. Fabritius
by Vernet C. Kauffman
Their Attorney

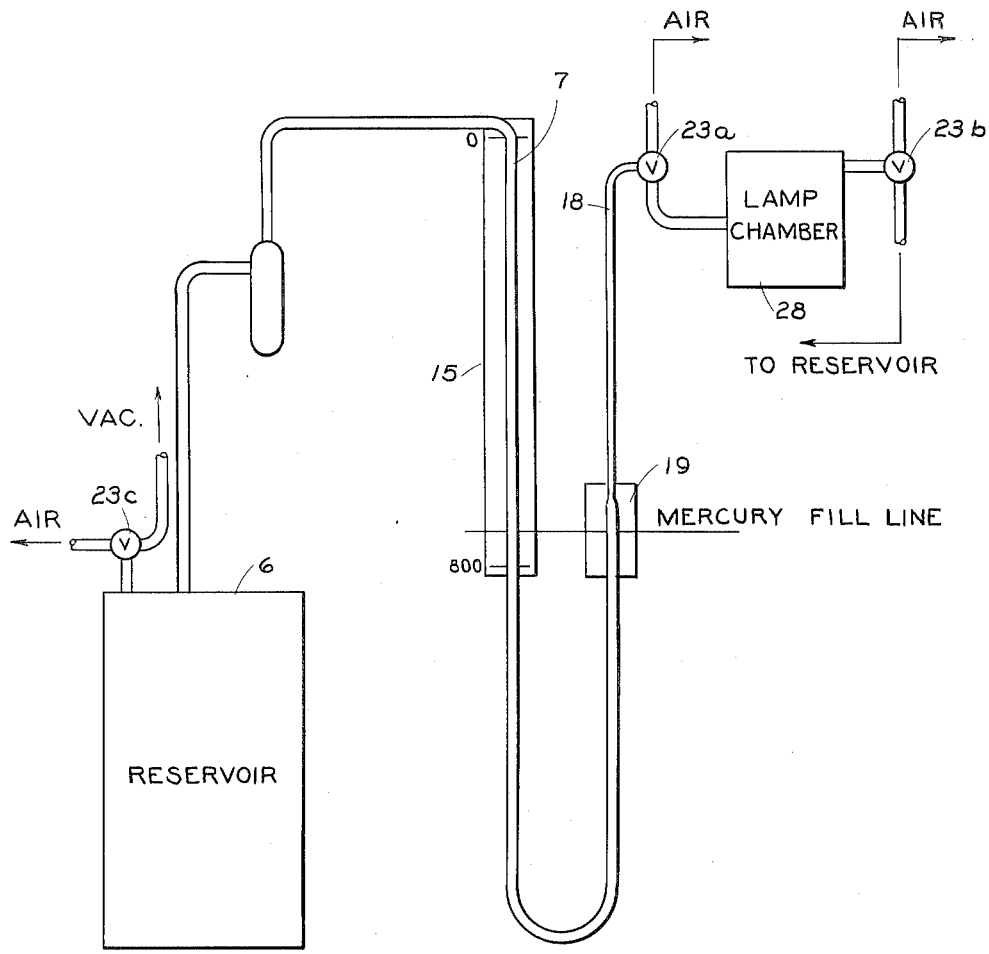

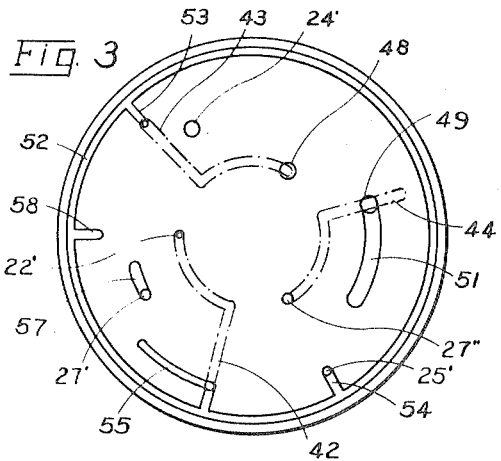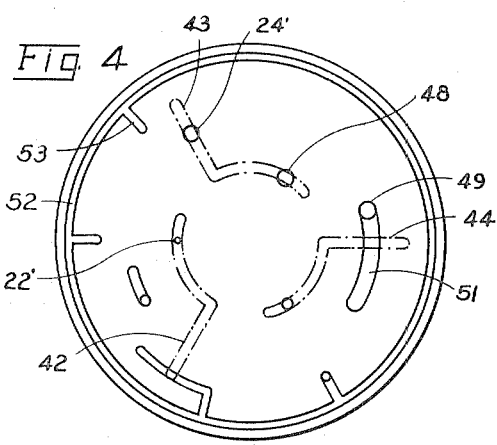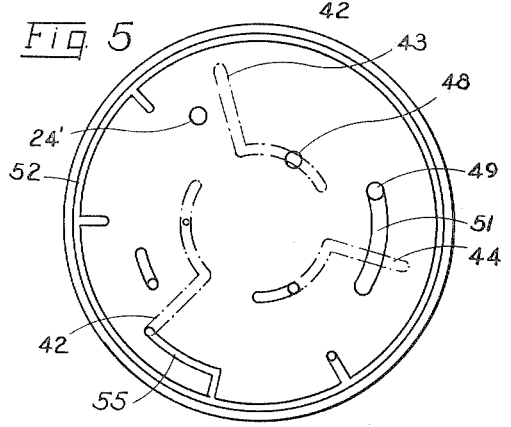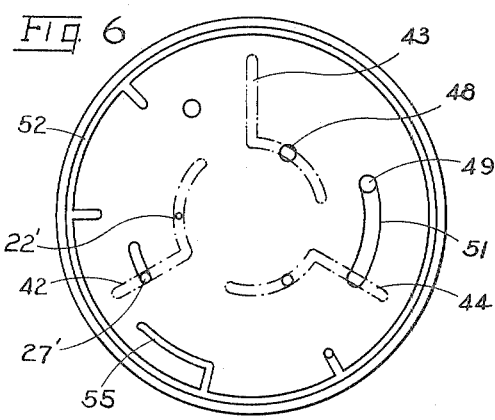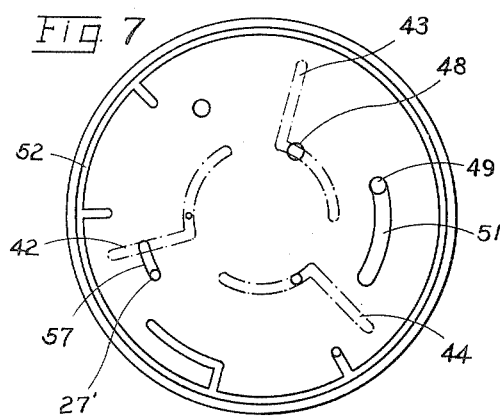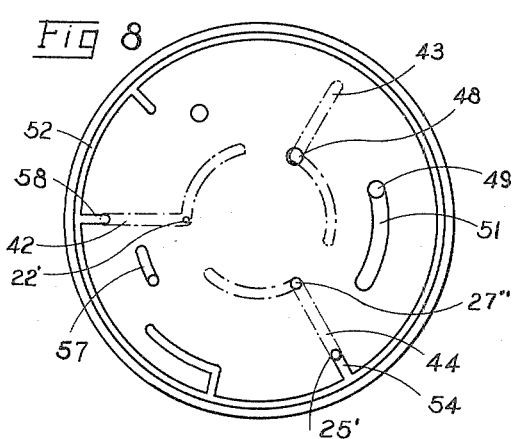

United States Patent Office 2,719,426
Patented Oct. 4, 1955

2,719,426

APPARATUS FOR MEASURING GAS PRESSURE IN SEALED VESSELS

Fredrick S. Lamb, Cleveland Heights, and George J. Fabritius, Euclid, Ohio, assignors to General Electric Company, a corporation of New York Application April 23, 1952, Serial No. 283,794

3 Claims. (Cl. 73—52)

The present invention relates to apparatus for measuring fluid pressures, and more particularly to apparatus for measuring gas pressures in sealed vessels.

In the manufacture of electric lamps and other similar sealed devices by automatic machines an accurate gauge for measuring the gas pressure in individual lamps taken from the machine at different stages of manufacture for checking purposes is highly desirable. The principal object of the present invention is to provide such a gauge of simple structure capable of measuring the said gas pressure when the pressure is either above or below atmospheric pressure and which is easily and expeditiously adjusted and manipulated in use. Another object of the invention is to provide a valve for such a gauge. Other objects and advantages of the invention will appear from the following detailed description of a species thereof.

Figure 1:
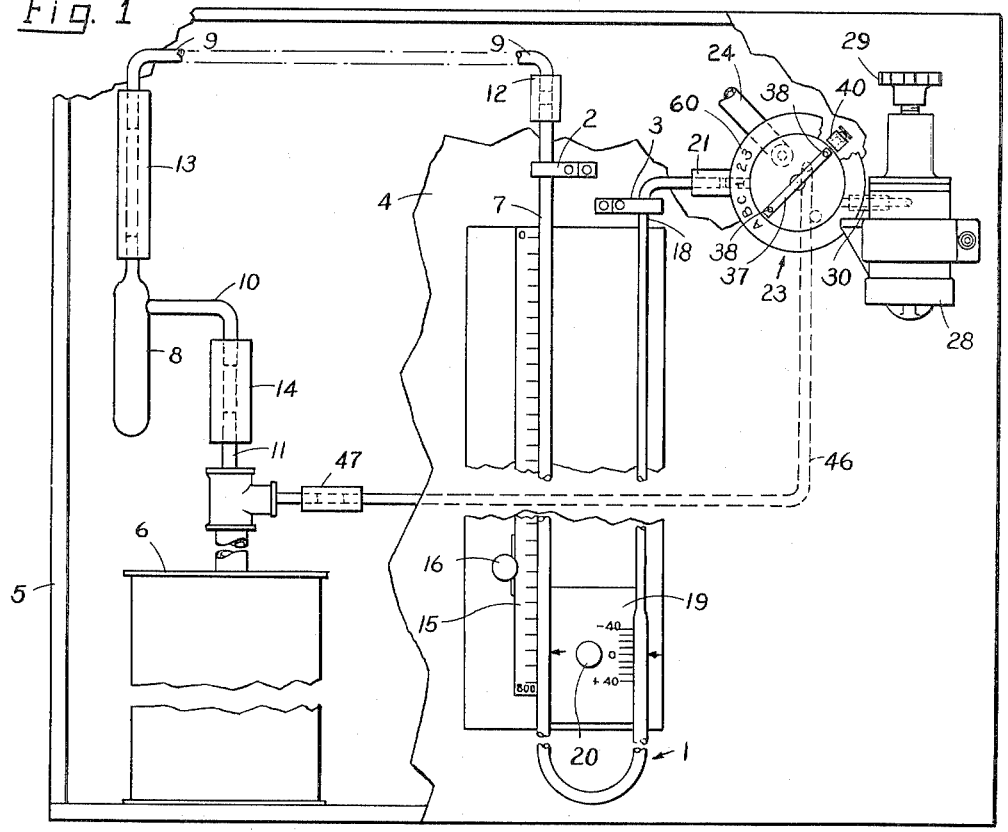
Figure 2:
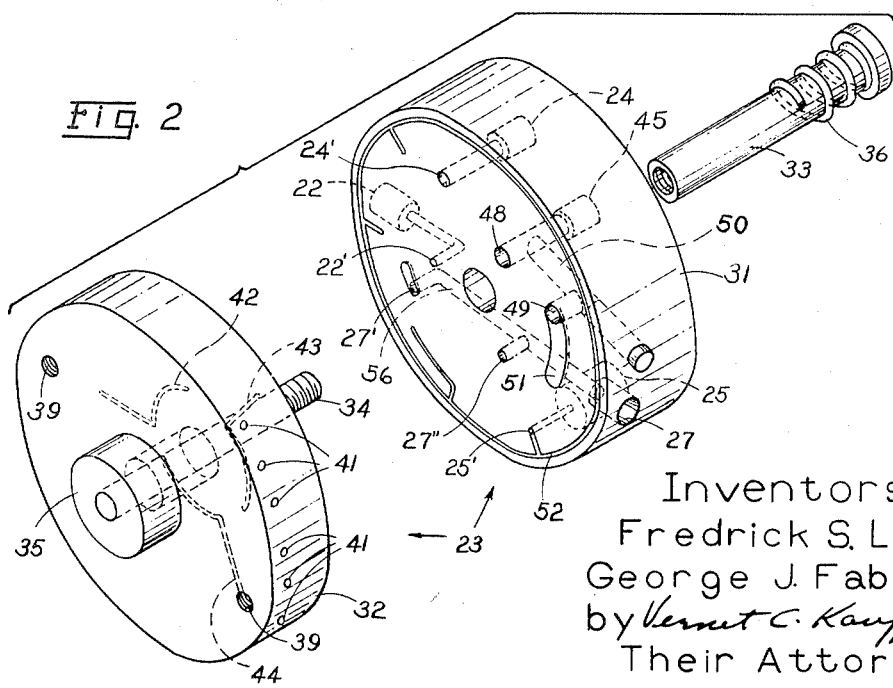

In the drawings accompanying and forming part of this specification a gauge and a valve both embodying the invention are shown in which, Fig. 1a is a diagrammatic illustration of the gauge; Fig. 1 is a front elevational view of the gauge with modified valve means and having parts thereof broken and shifted in position for clarity of illustration, Fig. 2 is an exploded view in perspective of the valve of the gauge shown in Fig. 1, and Figs. 3 to 8 are diagrammatic representations of the engaging faces of the valve shown in Fig. 2 in their various relative rotational positions for connecting the parts of the gauge together in desired sequence.

Referring to Fig. 1a of the drawings the gauge shown diagrammatically comprises, in general, a U-tube 1 about 36 inches in height the left leg 7 of which is connected directly to a large reservoir 6. The right leg 18 of the U-tube is connected to a three-way valve 23a in such manner that this leg of the U-tube may be opened to the atmosphere or connected to a lamp chamber 28. The U-tube is filled to a height of 18 inches with mercury. The entire left leg 7 and up to 1 inch above the mercury fill line of the right leg 18 of the U-tube is of three millimeter bore glass tubing. The remainder of the right leg 18 is of one millimeter bore glass tubing.

The lamp chamber 28 is provided with a two-way valve 23b to connect the chamber either to the reservoir 6 or to open it to the atmosphere. The reservoir 6 is provided with a similar valve 23c to connect the reservoir to a source of air under pressure different from atmospheric or to the atmosphere.

Along the left leg 7 of the U-tube is mounted a sliding scale 15, the graduations of which are such that the difference in the level of the mercury in the two legs 7 and 18 of the U-tube may be read on the left leg of the U-tube. The scale is numbered from 800 at the bottom to zero at the top and is used to set the pressure of the atmosphere in the reservoir 6 at the pressure expected in a lamp envelope and to correct for atmospheric pressure.

A scale 19 is provided adjacent the right leg of the U-tube on which the difference between the expected lamp pressure and the actual lamp pressure may be read.

By opening and closing the valves 23a, 23b and 23c in the proper sequence, which is described in detail hereinafter in conjunction with Figs. 1 to 8 wherein the said valves are shown combined into one valve 23 performing the same functions, the pressure in the system including the reservoir 6, the lamp chamber 28 and the legs 7 and 18 of the U-tube may be changed from atmospheric pressure to a predetermined pressure which is preferably approximately that expected in the sealed lamp envelope.

To measure the difference between the pressure in a sealed lamp envelope and the pressure expected therein, a lamp envelope of known volume is opened in the lamp chamber 28 when the latter is connected to the right leg of the U-tube and when the pressure in the lamp chamber 28 and both legs 7 and 18 of the U-tube is the expected pressure. The envelope pressure is thus balanced against the weight of the mercury to indicate the pressure difference. Of course, the volume in which the lamp envelope is opened, that is, the volume of the lamp chamber 28, exclusive of the space occupied by the lamp envelope, and the volume of that part of the right leg 18 of the U-tube not filled with mercury, must be known and this volume is conveniently made the same as the volume of the lamp envelope.

The gauge thus measures gas pressures in sealed vessels by opening such a vessel of known volume in a known volume, the vessel and volume pressures being about the same.

An important difference between the new gauge and prior gauges is that the known volume in which the sealed vessel is opened is constant in the new gauge regardless of the vessel pressure to be measured. This is accomplished by connecting the normally open left leg 7 of the U-tube to the reservoir 6 which is at the expected vessel pressure so that the U-tube indicates the difference between the expected vessel pressure and the actual vessel pressure. Vessel pressures of 50 to 800 mm. mercury column may be measured by the gauge.

The structural details of the gauge shown diagrammatically in Fig. 1a of the drawings are illustrated in Fig. 1 and, as shown in Fig. 1, the U-shaped glass tube 1 is held by brackets 2 and 3 on a support which constitutes the front panel 4 of a generally rectangular housing 5 enclosing the reservoir 6 shown at the left of Fig. 1. The reservoir 6 has been shown at the left of the tube 1 in the drawing for clarity of illustration but it will be understood that in the actual gauge the reservoir 6 is behind and to the right of the tube 1 and in the housing 5.

The left leg 7 of the U-tube 1 is connected directly to the reservoir 6 through a trap 8, the pipes 9, 10 and 11 and the sleeves 12, 13 and 14.

Mounted on the panel 4 and extending parallel with the left leg 7 of the U-tube 1 is the scale 15 calibrated for direct reading in millimeters from 0 at the top to 800 at the bottom. The scale 15 is mounted for sliding longitudinally of the left leg 7 by turning the knob 16 connected to the scale 15 by conventional rack and gear means and is used for the purpose hereinafter specified. Also mounted on the panel 4 between the left leg 7 and the right leg 18 of the U-tube 1 and calibrated for direct reading in millimeters to minus 40 at the top and to plus 40 at the bottom is the scale 19 mounted by conventional means for sliding on the panel 4 longitudinal of the tube legs 7 and 18 when the knob 20, connected thereto by a rack and gear mechanism, is turned.

The right leg 18 of the U-tube 1 is connected by the flexible sleeve 21 to a port 22 (Fig. 2) in the valve 23 also mounted on the front panel 4. The valve 23 is provided with an inlet port 24 for connection to vacuum or pressure system, a release port 25 which is open to the atmosphere and a port 27 connected to a chamber 28 also mounted on the front panel 4 and capable of holding a sealed glass lamp envelope the internal pressure of which is to be measured.

The lamp chamber 28 is provided with a knob 29 which is so connected with the internal parts of the chamber 28 that it is effective for breaking the seal of the lamp envelope in the chamber when the knob 29 is turned. The chamber 28 is gas-tight when closed and communicates with the port 27 of the valve 23 through the sleeve 30. Such chambers are well known in the art and inasmuch as the internal structure thereof constitutes no part of the present invention illustration of such structure has been omitted from the drawing.

As shown in Fig. 2 of the drawing the valve 23 is made up of a stationary circular valve plate 31 having the ports 22, 24 and 27 therein and a movable circular valve plate 32 which plates are held together by the shaft made up of the threaded tubular member 33 and the threaded bolt 34 having the head 35 against which the inner end of member 33 butts in the assembled valve. Of course, the parts 33 and 34 of the shaft may be made integral and the head 35 may then be a threaded collar engaging a threaded end of part 34 extending beyond plate 32. A spring 36 on the member 33 presses against the plate 31 to press the engaging faces of the valve plates 31 and 32 tightly together. The engaging faces of the valve plates are smooth except for the openings and grooves therein and a sealing oil is used between the plates to prevent gas leakage.

The valve 23 is provided with a handle 37 (Fig. 1) held by threaded bolts 38 engaging threaded holes 39 in the movable plate 32 and by which the latter may be turned on the shaft 33, 34 into six predetermined positions relative to the stationary plate 31 to bring the various parts of the gauge into communication with each other and the ports 24 and 25 as described below. A spring catch 40 (Fig. 1) is secured to the side of the stationary plate 31 and engages spaced holes 41 in the side of the movable plate 32 to releasably hold the latter in each of the said positions.

The engaging face of the stationary plate 31 is provided with various openings 22', 24', 25', 27' and 27" which communicate, respectively, with the port 22 connected to the leg 18 of the U-tube, the port 24 connected with the vacuum or pressure system, the port 25 open to the atmosphere and port 27 connected with chamber 28. The two openings 27' and 27" communicate with each other.

The engaging face of the movable plate 32 has therein grooves 42, 43 and 44 which have arcuate portions arranged in a circle concentric with the center of the plate 32 and straight portions, one extending radially from one end of each of said arcuate portions.

The stationary plate also has a port 45 which is connected to the reservoir 6 by the pipe 46 and the sleeve 47 (Fig. 1). The port 45 has a passage extending to the engaging face of plate 31 which passage has an opening 48 at the plate face. A second opening 49 at the face of the plate 31 communicates with the opening 48 and the port 45 through the channel 50 in the body of the plate 31 and a curved groove 51 extends along the said face of plate 31 from the opening 49.

As shown in Fig. 3 the openings 22', 27" and 48 at the face of the plate 31 are arranged in a circular pattern concentric with the center of said face so that the arcuate portions of the grooves 42, 43 and 44 overly the said openings in all predetermined positions of plate 32 as shown in Figs. 3 to 8.

In Fig. 2 the movable plate 32 is shown turned from its first position, shown in Fig. 1, to approximately its last position, shown in Fig. 8, with respect to the stationary plate 31 in order to show clearly the grooves 42, 43 and 44 in the engaging face of the plate 32. In Fig. 3 of the drawings the said plate 32 is shown at the first of its six positions with respect to the stationary plate 31 in which position it is also shown in Fig. 1.

In Figs. 3 to 8 of the drawings the movable valve plate 32 is shown in each of its six positions with respect to plate 31, the grooves 42, 43 and 44 in said plate 32 being shown in broken lines and the various numbered openings and grooves in the face of stationary plate 31 being shown in full lines.

As shown in Figs. 1, 2 and 3, when the movable plate 32 is in the first of its six positions the port 45 through its opening 48 is connected to the port 25 opening to the ambient atmosphere by the groove 43 in the plate 32 and the circular groove 52 in the plate 31, the inwardly and radially extending branch 53 of which is overlapped by the groove 43 and the similar branch 54 of which connects with the opening 25' of the port 25. Thus, the reservoir 6 and therewith the left leg 7 of the tube 1 connected with port 45 are connected with port 25 in this position of plate 32.

Similarly the right leg 18 of the U-tube is connected to the said port 25 through the port 22, the opening 22', the groove 42 and the branch 55 of the circular groove 52 which branch 55 extends first radially inward and then in an arcuate path in the direction of rotation of the plate 32.

The lamp chamber 28 is connected to the port 25 through the port 27, the channel 56 connecting the openings 27' and 27" to each other and to said port 27, the opening 27", the groove 44, the openings 49, channel 50, opening 48, groove 43, branch 53, groove 52, branch 54 and opening 25'.

In this position of the valve 23 the mercury is at the same level in both legs of the U-tube. The level of the mercury is indicated by the small arrows opposite scale 19 in Fig. 1.

With the vacuum system connected to the port 24 of valve 23 in operation, the gauge is then ready to measure the difference, if any, of the pressure in a sealed envelope, such as a sealed glass lamp envelope, and a predetermined pressure desired in the lamp envelope.

While the gauge is capable of measuring such differences in pressure either above or below atmospheric pressure the following description will be confined to the case in which the pressure difference to be measured is below atmospheric pressure.

Before the plate 32 of the valve 23 is moved to its second position, shown in Fig. 4 of the drawings, a sealed glass lamp envelope is placed in the lamp chamber 28 and the lamp receiving opening in the chamber is hermetically closed. A reading of a barometer is taken to ascertain the atmospheric pressure and the scale 15 at the left of the U-tube 1 is then raised or lowered as required to set the scale with the barometric pressure reading at the level of the mercury column in the left leg 7 of the U-tube. The movable valve plate 32 is then turned to its second position (Fig. 4) which moves the groove 43 from the branch 53 and over the opening 24' thus disconnecting from the port 25 the reservoir 6, the left leg 7 of the U-tube and the lamp chamber 28 and connecting these parts to the vacuum system through the port 24. The right leg 18 of the U-tube remains at atmospheric pressure being connected to the port 25 as described above.

When these parts 6, 7 and 28 of the gauge have been evacuated to the extent that the pressure reading on the left hand scale 15 is equal to the predetermined pressure expected in the lamp envelope, it being noted that the said scale 15 is mounted with the zero mark at the top, the valve plate 32 is turned to its third position which is shown in Fig. 5 of the drawings.

By turning the plate 32 to its third position the groove 43 is moved from the opening 24' of the port 24 so that the left leg 7 of the U-tube, the reservoir 6, and the lamp chamber 28 are shut off from the vacuum system and all remain at the pressure expected in the lamp envelope.

Turning the plate 32 to its fourth position (Fig. 6)

moves the groove 42 from the branch 55 so that the right leg 18 of the U-tube is no longer connected to the port 25 and is connected with the lamp chamber 28 and the other evacuated parts 6 and 7 of the gauge through the groove 42, the opening 27' and the channel 56 communicating with chamber 28 through port 27 (Fig. 2).

The atmosphere in all parts of the gauge is then at the same reduced pressure and the mercury level is at the same height in both legs of the U-tube.

The valve plate 32 is then turned to its fifth position (Fig. 7) in which the groove 44 leaves the groove 51 to disconnect the lamp chamber 28 from the left leg 7 of the U-tube and the reservoir 6 but to leave the lamp chamber 28 and the right leg 18 of the U-tube connected together through the arcuate groove 57 extending from said opening 27' and the other grooves, openings and channels described in connection with Fig. 6.

With the lamp chamber 28 so connected the knob 29 thereof is turned to break the seal of the lamp envelope in the chamber to release the lamp atmosphere and balance the pressure thereof against the weight of the mercury. If the pressure of the atmosphere sealed in the lamp envelope is different from the pressure of the atmosphere in the gauge the mercury level in the right leg of the U-tube will be changed correspondingly by the change in pressure existing in the right leg 18 and the lamp chamber 28 on breaking of the seal of the lamp envelope.

This difference in pressure, if any, may be measured by setting the scale 19 between the legs 7 and 18 of the U-tube with the zero line thereof at the level of the mercury in the left leg 7. The difference in pressure is then indicated by the distance between the level of the mercury in the U-tube legs 7 and 18 and this distance is easily read on the scale 19 which is calibrated in millimeters as is the scale 15. The pressure in the lamp envelope is calculated simply by adding to or subtracting from the predetermined pressure this difference.

The volume of the lamp chamber 28, exclusive of the space occupied by the lamp envelope, the U-tube leg 18 and the passages in the valve 23 connecting these members is preferably the same as the volume of the lamp envelope. When the pressure of the atmosphere in lamp envelopes of various sizes is to be measured by the gauge the volume of the envelope with respect to the volume of the aforesaid gauge parts must be calibrated and the scale 19 modified where the ratio is other than a 1 to 1 ratio as in the gauge described above as a specific example of the invention.

When the difference in pressure has been ascertained the valve 23 is moved to its sixth position shown in Fig. 8 which moves the groove 42 from the groove 57 to the branch 58 of the circular groove 52 and thus restores atmospheric pressure to the right leg 18 of the U-tube through port 25. This same positioning of the plate 32 moves the groove 44 over the opening 25' so that the lamp chamber is also connected through openings 27" and 25' to the port 25 opening to the atmosphere and atmospheric pressure is restored to the lamp chamber 28 from whence the broken lamp envelope may be removed.

Reservoir 6 and the U-tube leg 7 remain at the predetermined and expected pressure so that in order to measure a second lamp envelope it is not necessary to turn the plate 32 back to its original position shown in Fig. 3 but only to its fourth position, shown in Fig. 6, after the second lamp envelope has been mounted in the lamp chamber 28 and the lamp receiving opening in the lamp chamber has been hermetically closed. The connections between and the pressure of the atmosphere in the various parts of the gauge with the plate 32 in its fourth position are as described above in connection with Fig. 6 so that the difference in pressure if any between the expected pressure and that in the succeeding lamp envelope may be accurately measured by turning the plate 32 from its fourth, to its fifth position and thence to its sixth position, breaking the lamp envelope at the proper time, as described above.

The valve 23 is provided with a dial 60 on which the first three positions of the handle 37 of the plate 32 are indicated by the letters "A," "B" and "C" and the last three positions thereof by the numerals "1," "2" and "3" to facilitate manipulation of the valve.

When the atmosphere in the lamp envelope is above atmospheric pressure the port 24 is connected to a pressure system rather than a vacuum system. The gauge is used in the same manner described above for measuring the pressure in such lamp envelopes.

A plurality of lamp envelopes may be quickly tested by use of the above described gauge to the end that the manufacture of such lamps with accurate control of the pressure of the atmosphere therein, at different stages of manufacture is greatly facilitated to reduce the manufacturing cost and improve the quality of the lamps.

What we claim as new and desire to secure by Letters Patent of the United States is:

1. A system for measuring the pressure in sealed vessels comprising a U-tube containing mercury, a reservoir connected directly with one leg of said U-tube, a chamber for receiving a sealed vessel the pressure of the atmosphere in which is to be measured, and valve means having separate ports connected with said reservoir, said chamber and the other leg of said U-tube, said valve means having also a port for connection with a source of air under a pressure different than atmospheric pressure, a port opening to the atmosphere and passages extending thereinto from said ports, said passages being shaped and positioned to selectively communicate with each other and thus to selectively connect said ports with each other on successive movements of said valve to effect, first a change in the pressure in said chamber, said reservoir and the U-tube leg connected therewith from atmospheric to a pressure approximating that in the sealed vessel and indicated by the change in position of the mercury column, then a change in the pressure in the other leg of said U-tube from atmospheric to the said predetermined pressure to return the mercury column to the same level in both U-tube legs and then, on opening of the sealed vessel, the balancing of the pressure of the atmosphere in the said vessel against the weight of the mercury to indicate the difference between the approximate pressure and the pressure of the atmosphere in said vessel and therewith the actual pressure existing in said vessel prior to its opening.

2. A system for measuring the pressure of the atmosphere in a hermetically sealed vessel comprising in combination, a manometer including a U-tube containing mercury, a gas-tight reservoir directly connected with one leg of said tube, a gas-tight chamber for receiving said sealed vessel and a valve having a plurality of ports, one of said ports being connected to said reservoir and therethrough to the said leg of the U-tube, another of said ports being connected to said chamber and a third port being connected to the other leg of said U-tube, said valve having also a fourth port opening to the atmosphere and a fifth port for connection with a source of air under a pressure different from atmospheric pressure, said valve being made up of a stationary circular plate having said ports and a rotatable circular plate, the engaging faces of said plates being in gas-sealing engagement and said rotatable plate being turnable into predetermined angular positions with respect to said stationary plate and having elongated grooves in its operative face, said stationary plate having passages opening at its operative face and communicating with said ports, the grooves in said rotatable plate and the openings in said stationary plate being so shaped and positioned with respect to each other that, in the first position of said rotatable plate, all parts of said gauge are connected with said fourth port opening to the atmosphere, in the second position of said rotatable plate, the said chamber, said reservoir and the leg of the U-tube connected therewith are disconnected from said fourth port and connected with said fifth port to change the pressure of the atmosphere in said gauge parts from atmospheric pressure to a pressure approximating that in the sealed vessel, in the third position of said rotatable plate, the said gauge parts are disconnected from said exhaust port, in the fourth position of said rotatable plate, the other leg of said U-tube is disconnected from said fourth port and connected with said lamp chamber and the atmosphere in all of said gauge parts is at the approximate pressure and the mercury column is at the same level in both legs of the U-tube, in the fifth position of said rotatable plate, said chamber is disconnected from said reservoir and the leg of the U-tube conected with said reservoir and said chamber remains connected with the other leg of said U-tube whereby breaking of the sealed vessel in said lamp chamber with the rotatable plate in this position balances the pressure of the atmosphere of the vessel against the weight of the mercury in the U-tube to indicate the difference in pressure between the predetermined pressure and the pressure of the atmosphere in said vessel, and, in the sixth position of said rotatable plate, connects said right leg and said chamber to said fourth port but not said reservoir or the U-tube leg connected therewith whereby said vessel may be replaced in said chamber by the succeeding vessel to be measured and the pressure in said vessel measured by first turning the rotatable plate back to its fourth position and then to its fifth and sixth position.

3. A valve comprising a stationary circular valve plate and a movable circular valve plate the engaging faces of which are in gas sealing engagement with one another, said stationary plate being provided with a release port opening to the atmosphere, an inlet port for connection with a source of fluid under pressure different from atmospheric pressure and a plurality of ports for selective connection with said inlet and release ports, all said ports being spaced from the engaging face of said stationary plate and having passages opening at said face, the passage openings of the ports for connection with said inlet and release ports being disposed in a circular pattern concentric with the center of the engaging face and the passage openings for said inlet and release ports being offset radially from the said circularly positioned passage openings, the engaging face of said movable circular valve plate being provided with a plurality of spaced grooves having straight portions and arcuate portions and corresponding in number to the ports provided in said stationary plate for connection with said inlet and release ports, the arcuate portions of said grooves overlying said circularly positioned passage openings in said stationary plate, the straight portions of said grooves extending radially and selectively overlying the passage openings of said inlet and release ports upon rotation of the movable valve plate to selectively bring the ports for connection with said inlet and release ports into communication with said last named ports.

References Cited in the file of this patent

UNITED STATES PATENTS

| | | |
|---|---|---|
| 913,321 | Thomas | Feb. 23, 1909 |
| 1,184,272 | Teneyck | May 23, 1916 |
| 1,702,982 | Schroder | Feb. 19, 1929 |
| 1,900,918 | Dieter | Mar. 14, 1933 |
| 2,467,767 | Mertler | Apr. 19, 1949 |
| 2,533,712 | Campbell | Dec. 12, 1950 |
| 2,562,494 | Hejduk | July 31, 1951 |

FOREIGN PATENTS

| | | |
|---|---|---|
| 121,620 | Great Britain | Dec. 10, 1918 |